Jan. 6, 1970  F. C. LEE  3,487,857
GAS CLAMP
Filed Sept. 8, 1967  2 Sheets-Sheet 1
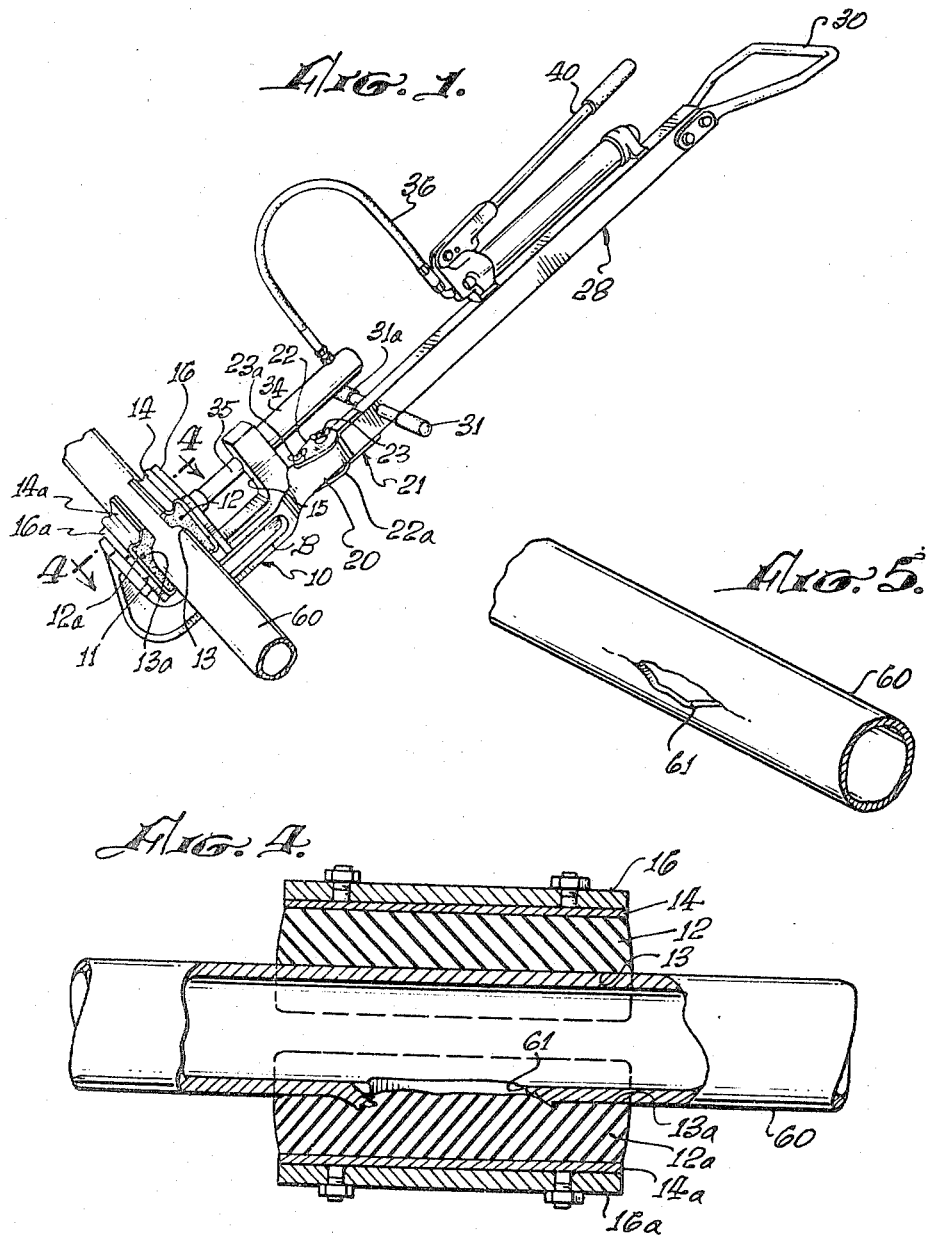
INVENTOR.
FRED CURTIS LEE,
By His Attorneys
Spensley & Horn Jan. 6, 1970
F. C. LEE
3,487,857
GAS CLAMP
Filed Sept. 8, 1967
2 Sheets-Sheet 2
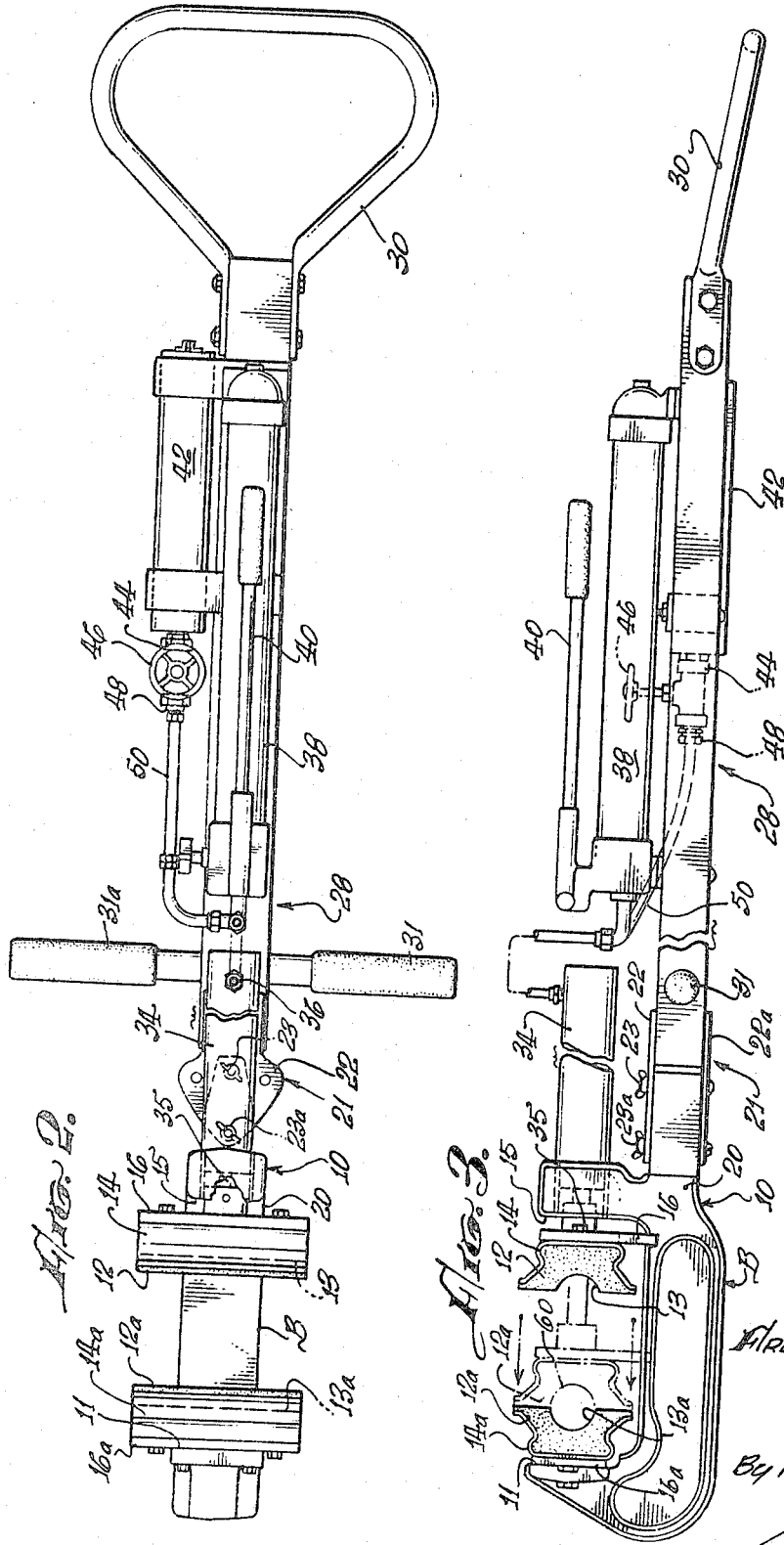
INVENTOR.
ALFRED CURTIS LEE,
By His Attorneys
Spensley & Horn.

United States Patent Office 3,487,857
Patented Jan. 6, 1970

3,487,857
GAS CLAMP
Fred Curtis Lee, Los Angeles, Calif., assignor, by mesne assignments, to Pike Corporation of America, Los Angeles, Calif., a corporation of California
Filed Sept. 8, 1967, Ser. No. 666,282
Int. Cl. F16l 55/16; B25b 1/18
U.S. Cl. 138—99                                        8 Claims

ABSTRACT OF THE DISCLOSURE

The subject invention is a clamping device having a clamp frame assembly comprising a head portion and a frame extending longitudinally from the head portion. Two diametrically opposed resilient force blocks are located within the head portion of the clamp, one of which is adapted to be moved by a hydraulically operated ram which is attached to the head's frame. The ram forces the one resilient force block against the other to close around an object to be clamped. The head portion is rotatably connected to the longitudinally extending frame portion and can be used in various positions. The device has utility in rapidly sealing off leaks in various diameters of gas pipes and such, even where the pipe itself is deformed or where a very large torn hole has developed in the pipe.

BACKGROUND OF THE INVENTION

Field of the invention

This invention relates to a device for clamping and sealing off leaks in gas pipes or pipes carrying various fluids. More particularly, the invention relates to a hydraulically operated clamp having resilient force blocks which under pressure seal off a broad variety of leaks over which they are placed.

Description of the prior art

In the maintenance of pipe lines such as lines for the transmission of gas, water, steam or the like, leaks caused by cracks or punctures in the pipe should be repaired least temporarily by the application to the pipe of a leak sealing clamp.

Prior art leak repair clamps comprise essentially body portions of specific radius having a leak sealing gasket means for application over the damaged section of specific size of pipe and a clamping portion for drawing body portions against the pipe to compress the gasket into a fluid sealing relationship. Various types of repair clamps are in use. However, they involve a construction which depends upon a relatively thin gasket independent of the clamping means, which gasket is of a material which will chemically resist the particular material that is escaping from the pipe. To affect the seal, the gasket must be applied to the puncture with a high amount of pressure to force the gasket around the puncture. Most of the prior art gaskets when forced into position over the holes in the pipe are in a stretched condition and are susceptible to rupturing stresses.

Furthermore, the heretofore known types of leak repair clamps require the putting together of various sections of the clamping body and the tighening thereof by mechanical means. In view of the fact that it is particularly desirable to close a pipe leak as promptly as possible since the escape of gas or liquid is not only wasteful but sometimes hazardous, it is highly advantageous to have available an efficient clamp which is easy to handle and which embodies a pressure source integrally connected to a clamp having resilient force blocks which will fit any size rupture in a broad range of sizes of pipe.

Accordingly, it is the principal object of the present invention to provide a leak repair clamp having a resilient force block clamping means and a pressure source attached to the clamp itself, the force block clamping means and the pressure source comprising an integral unit and being adapted to fit a broad range of sizes of pipe.

It is another object of the present invention to provide a leak repair clamp in which the clamping means comprises resilient blocks or resinous material which is deformable and which underpressure conforms to the configuration of various articles being clamped thereby sealing ruptures in said articles.

Yet another object of the present invention is to provide a leak repair clamp having a head clamping section which is rotatably connected to a frame assembly thereby allowing application of the clamp in hard-to-get-to locations by allowing the clamp to be utilized at various angles.

Still another object of the present invention is to provide a leak repair clamping means having a hydraulic power source connected to the frame and to the head clamp of said device such that pressure can be quickly applied to the resileint clamping means.

SUMMARY OF THE INVENTION

In one of its broadest aspects, the invented leak sealing clamp comprises a clamp frame assembly having a head portion and a frame extending longitudinally therefrom. Resilient clamping means are connected to the clamp head portion, the clamping means being adapted to deform and to conform to the configuration of a clamped work piece under pressure. Biasing means are connected to the clamp frame assembly and to the resilient clamping means, the biasing means being adapted to apply pressure to the clamping means, thereby forcing them together and to close upon a work piece having a leak.

One advantage of the invented clamping device is that the clamping means employed are resilient and will deform under a moderate amount of pressure to flow around and seal off ruptures in pipes in a broad range of configurations including twisted or bent pipes. Another advantage of the invented structure is that the biasing means mounted on the frame of the clamp can be rapidly activated to force the clamps closed thereby affording an easy and quick method of applying pressure to a ruptured pipe. Yet another advantage of the invented pipe sealing clamp is that the clamp will fit a wire variety of sizes of pipe without the necessity of having to interchange the resileint clamping blocks. Furthermore, the material used in the clamping blocks is resistant to corrosion, is tear resistant and flows under only a moderate amount of pressure. The resilient clamping blocks in their assemblies can also be easily removed from the clamp head portion and can be replaced with new blocks.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

In the drawings:
FIGURE 1 is a perspective of the invented clamp in position on a ruptured piece of pipe;
FIGURE 2 is a plan view of the invented clamp;
FIGURE 3 is a partially sectioned side elevation of the invented clamp;

FIGURE 4 is a front view partially sectioned of the force blocks in position on a ruptured pipe; and, FIGURE 5 is a perspective of a ruptured piece of pipe.

DESCRIPTION OF THE PREFERRED EMBODIMENT

Referring now to FIGURES 1 through 5 and specifically to FIGURE 3, clamp head 10 has the general configuration of the C clamp, that is, the clamp head has a base 9 and two vertically extending faces, comprising first face 11 and second face 15. A shaft 20 extends longitudinally from the base of the C shaped structure. Two resilient force blocks 12 and 12a are located respectively adjacent upstanding vertical face 15 and 11 of the clamp head. Force block 12a is fixedly attached to face 11 by bolting or other conventional means. Force block 12 within its assembly 14 is attached to ram plunger 35 which is adapted to move block 12 towards block 12a by the application of pressure.

The force blocks 12 and 12a are generally rectangular shaped members except for outwardly flaring edges at the front face thereof and having contoured surfaces 13 and 13a in the front face thereof. The contours are such that they will generally conform to pipes of various diameter circular cross section.

The force blocks can be formed from a flexible sealing material which is resistant to deterioration by gas, oil or other liquids. Various materials are suitable for the force blocks, including synthetic rubbers and resins which can be cured to have a desired hardness and flexibility. The force blocks 12 and 12a have a sufficient degree of resiliency to permit the surface thereof which bears on the leaking pipe 60 to shape itself to the contour of the pipe in a substantially flowing action when under pressure applied by biasing means 34 to which block 12 is attached. The characteristics of the force block material are such that when they are closed upon the pipe, the force blocks are deformed by pressure (supplied by biasing means 34 through plunger 35) to conform to the configuration of the pipe around which they are placed, and to conform to minute surface irregularities of the pipe thereby insuring a positive sealing engagement thereof with the pipe. The force blocks must be sufficiently thick and contain sufficient material to allow a substantial amount of flow and deforming around all sizes of pipe to cover various irregular holes and tears in such pipes. One material which has been used with success in the present invention is a urethane casting resin.

One particular urethane casting resin formulation that has successfully been used as a force block casting resin consists of the following constituents:

| | Percent |
|---|---|
| Resolin 267a | 56 |
| Resolin 267b | 11 |
| Resolin 281b | 33 |

The Resolin resins are manufactured by the Resolin Company of Santa Monica, Calif., whose trademark is Resolin. The force blocks can conveniently be cast and cured. When cured, the urethane resin achieves a Shore A hardness in the range of approximately 55–65. This material can be deformed sufficiently to flow around and seal holes in a pipe by pressures above about 500 p.s.i. This material also has the characteristic of reverting to its original configuration when the pressure is removed. Another material that could be used is a partially cured neoprene rubber compound having a Shore A hardness in the range of about 50–65.

The dimensions of the force block can, of course, range through a wide variety of sizes. However, a convenient size of force block for fitting 2", 3", 4" and 6" pipe is 8" long by 5" wide by 2" thick with a curved portion of approximately 1 inch radius molded into the front face thereof. The thickness of other force blocks can vary from about one half inch for ½ to 1½" diameter pipe to about 4" for 8 to 12" diameter pipe.

The force blocks 12 and 12a are firmly engaged by block holders 14 and 14a. The holders are mdae of relatively thin-walled steel or other flexible metal which under pressure will deflect sufficiently to allow the force blocks to flow in a lateral direction and yet will firmly retain a portion of the force blocks. The block holders are crimped so that the blocks are firmly engaged even when they begin to flow under pressure. The material of the blocks can flow in a lateral direction and in a circumferential direction without being ejected from the block holder. The flanges of the block holders further serve as resilient backing supports for the deformed force blocks.

The block holders are so constructed and of such material that the flanges thereof are sufficiently flexible to accommodate the lateral deflection of the force block while exerting a spring force which limits the lateral deformation under high pressure. Thus, a combination of inward pressures are exerted by the distortion of the resilient force block and the flanges of the block holder. Deflection of the flanges increases accommodation of various pipe sizes, various degrees of damage and resulting protrusions and distortions of the pipe being clamped and permits more efficient sealing action of the force block. In the presently preferred embodiment the flanges are generally S-shaped in configuration and are formed of mild steel approximately 3/16" in wall thickness. Other materials, wall thicknesses and configurations are of course possible in view of the teachings herein. The block holders also serve to allow attachment of the force blocks to reinforcing plates 16 and 16a.

Reinforcing plates 16 and 16a are adapted to be connected to the back face of the force blocks by bolts; and blocks being bolted on a block holders 14 and 14a. Adhesive bonding could also be used to attach the force blocks to the block holders 14 and 14a and to reinforcing plates 16 and 16a. Both the block holders and the reinforcing plates are preferably made of a tough metal such as steel and should be of sufficient mecanical strength and thickness to withstand the forces imposed when pressure is applied to the blocks to close a leak.

Face 11 of the C clamp 10 is fixed and attached thereto is reinforcing plate 16a which in turn is attached to block holder 14a containing force block 12a. Reinforcing plate 16a can be removably connected to face 11 of the C clamp by any conventional means such as bolting. When installed, force block 12a and holder 14a are in a firmly fixed position with contour 13a having its longitudinal axis going in a transverse direction along the block and with the front face facing the front face of block 12.

Vertical face 15 of the C clamp has an opening therethrough to accommodate a biasing means 34. In the preferred embodiment of this invention, the biasing means is a hydraulic ram 34 with a plunger 35 which is connected to the back of reinforcing plate 16 which in turn is connected to the back of block holder 14 by means of bolts or other conventional means. Hydarulic ram 34 is adapted to supply sufficient pressure to bias force block 12 towards force block 12a and to force the blocks to flow and to conform to irregularities in a pipe, thus sealing leaks in the pipe.

Sometimes, when applying the device to a leak on one side of a relatively large diameter pipe, the force blocks 12 and its block holder 14 can be removed. Biasing means 34 then forces plate 16 against one side of the pipe while block 12a covers the leak on the other side.

Shaft 20 of the clamp head is rotatably connected to clamp frame 28 by means of yoke 21. The yoke comprises generally triangular plates 22 and 22a which sandwich between them, shaft 20 and the front end of frame 28, the whole being joined together by bolts 23 and 23a in such a manner that the clamp head 10 is free to move in a lateral direction while pivoting around bolts 23 and 23a and while frame 28 is in a longitudinally extended position. Thus, it is possible to rotate clamp head 10 to a predetermined angle to grasp a pipe while an operator manipulates frame 28 and activates hydraulic pump 38. The yoke 21 also makes possible the rapid removal of clamp head 10 from frame 28; the same or a new clamp head can then be easily reattached to frame 28.

Frame 28 is a longitudinally extending member having its forward end connected to yoke 21 between plates 22 and 22a. Near the forward end of said frame 28 there are situated auxiliary handles 31 and 31a to aid in the positioning of the clamp. At the rear end of frame 28 there is a handle 30 which is integrally bolted to the side of frame 28. Situated on the top surface of the frame is a power source for ram 34, which adctivates ram plunger 35. In the presently preferred emobdiment of the invention, this is a manually operated hydraulic pump 38 having a handle 40 which can be pumped by the operator of the clamp. It would, of course, be within the broad scope of the invention to provide other biasing means for plunger 35 such as, for instance, a pneumatic power source or a purely mechanical power source.

Connected to one side of frame 28 is an accumulator 42 having an outlet 44 and control valve 46. An accumulator hose 50 is adapted to take fluid from accumulator 42 through a flexible hose 36 to hydraulic ram 34, which activates plunger 35. Hose 36 connecting accumulator 42 and ram 34 is flexible and is of sufficient length to remain connected to the ram when the clamp head 10 is rotated to any operating angle in a lateral direction. Thus, clamp head 10 is allowed free movement and yet is constantly connected to the hydraulic power source. Head assembly 10 can be easily separated from frame 28 by removing bolts 23 and 23a and removing hose 36. The separate head assembly can then be placed in position on a pipe which is in a difficult position to reach. Frame 28 can then be reconnected to the head assembly after use.

In operation, hydraulic pressure is maintained by pumping fluid from hydraulic pump 38 with valve 46 open through line 50 until accumulator 42 is full; then valve 46 is closed. The clamp head 10 is placed with its opening upward or downward and with force blocks 12 and 12a in close proximity to a pipe 60 having a rupture 61 therein from which gas or fluid is escaping. Contours 13 and 13a are adapted to fit approximately around the variable circumference of pipe 60. The clamp operator or operators can direct the clamp by controlling the frame by means of handles 30, 31 and 31a. Valve 46 is then opened and hydraulic fluids are conducted through hose 50 and through hose 36 to hydraulic ram 34 which actuates plunger 35 thereby forcing against reinforcing plate 16 which biases force block 12 towards force block 12a which is in a fixed position. The pressure thus applied to the force blocks causes said blocks to flow and to deform. Some of the deformation is accommodated by the block holders 14 and 14a. The material of the blocks conform to the surface of pipe 60, sealing off rupture 61 and conforming to other irregularities or bends or twists in the pipe. This affects a quick and tight seal which prevents any further escape of gas or fluids. For additional force or for further use accumulator 42 can be recharged by pumping handle 40 of hydraulic pump 38. The thickness of the force blocks is such that when pressure is applied to the reinforcing plates the material of the blocks flows circumferentially around a pipe; there is sufficient material in the blocks to insure that they remain attached to the block holders and to insure that they will continue to flow if more pressure is applied. It is, of course, obvious that because of the resilience of the material of which the force blocks are made that the same blocks can be used to seal leaks on various diameter pipes. The larger the pipe's diameter, the more pressure will be required to make the force blocks flow sufficiently to cover a large enough segment of the pipe's circumference and the more deformation will be accommodated by flexing in the flanges of the blocks holders. When pressure is removed from the force blocks they and the block holders revert to their original configuration.

It is apparent from the foregoing that the invented leak clamp provides a rapid means of sealing gas or liquid leaks in pipes. This is accomplished by providing force blocks which can be made to flow over a surface by applied pressure, which surface is then sealed off because of the resiliency and sealing properties of the force block. Another advantage of the invented clamp is that the biasing means is an integral part of the clamp and whereas prior art clamps require mechanical tightening of nuts and bolts of two opposing halves of a clamp or a sleeve, the present invention requires only the opening of a valve to allow a hydraulic fluid to actuate a ram which provides the required pressure the ram being an integral part of the clamp frame assembly. Another advantage of the invented device is that an operator can operate the clamp from a distance of a few feet and does not have to get too close to the gas pipe upon which he is working and yet can still adequately control the clamping action. Furthermore, the clamp head is rotatably attached to the frame and therefore the operator can work the clamp at a desired angle if necessary. Yet another advantage of the invented gas leak clamp is that the same force blocks can be used to seal off various diameter pipes. This is because of the fact that the resilient material used has enough elasticity and flowability to conform to various sizes of surfaces, is also provided in sufficient thickness so that if higher pressure and more flow is needed there is sufficient material present to maintain the sealing structure, and is given additional flexibility through the deflection of thin steeel flanges of the block holder. The head assembly of the clamp can conveniently be removed from the frame while the head is attached to a pipe in a difficult location. The head assembly can then be reconnected to the frame just prior to applying pressure. It is also possible to provide interchangeable head assemblies for extra large size pipes, which assemblies fit into frame 28 and can be rotatably connected thereto. Still another advantage of the invented clamp is that a wide range of pressure can be quickly applied to the force blocks by proper use of the hydraulic pump and accumulator. Prior art devices are very limited as to the pressure that can mechanically be made to bear on a gasket. The clamp head assembly can also be used without using a frame, all that is required is the connection of a biasing means to the head assembly to apply pressure to a leak.

Although this invention has been disclosed and illustrated with reference to particular applications, the principles involved are susceptible of numerous other applications which will be apparent to persons skilled in the art. The invention is therefore, to be limited only as indicated by the scope of the appended claims.

What is claimed is:

1. A leak clamp comprising:
   a clamp frame assembly having a substantially C-shaped head portion and a longitudinally extending frame member;
   at least one resilient force block assembly including the channel-shaped force block holder, said holder having flexible diverging flanges, a force block fitted within said holder, said force block assembly being located within said head portion and said force block assembly being connected to a biasing means, the force block being of substantial thickness and of predetermined geometry as to be adapted under pressure to conform to irregularities in a surface and being adapted to flow over and around irregularities in a pipe; and
   biasing means, said biasing means being connected to said frame member and being removably connected to said force block assembly, said biasing means being resilient at a different spring rate than said force block and adapted to urge said force block assembly towards an opposing surface.

2. The leak clamp as defined in claim 1 wherein the resilient force block is made of a cured polyurethane resin.

3. The leak clamp as defined in claim 1 wherein the resilient force block is made of partially cured neoprene rubber.

4. The leak clamp as defined in claim 1 wherein said force block is of a flowable resilient material and has a thickness in the range of approximately ½" to 4".

5. In a clamp device having at least one force block assembly:
   a force block, said force block being comprised of a resilient material and being of relatively deep cross section, said force block being of a geometry and thickness to accommodate a variety of sizes and shapes of pipe; and
   a channel-shaped force block holder having flexible diverging flanges, said force block holder being sufficiently flexible in its flanges to accommodate some of the distortion imposed on the force block when under pressure, said force block holder being adapted to retain the force block from excessive deformation.

6. The clamp device as defined by claim 5 wherein said force block holder is shaped in the form of a trapezoidal channel cross section with legs and with an S curved bend in the base of each leg of the channel stretch which serves to positively engage a cast-in resilient force block.

7. The clamp device as defined in claim 6 wherein said block holder is shaped in the form of a trapezoidal channel cross section having flanges and having holes in the flanges for positively holding a cast-in resilient force block.

8. The clamp device as defined in claim 7 wherein said block holder is shaped in the form of a trapezoidal channel cross section and said resilent force block is fastened to said block holder with adhesive.

References Cited

UNITED STATES PATENTS

| 712,019 | 10/1902 | Thomas et al. | 138—99 |
| 847,594 | 3/1907 | McCreary | 138—99 |
| 1,843,057 | 1/1932 | Wood et al. | 138—99 |
| 2,236,691 | 4/1941 | Merrill | 138—99 |
| 2,529,411 | 11/1950 | Northrup | 138—99 |
| 2,651,094 | 9/1953 | Dodge. | |
| 2,663,537 | 12/1953 | Gagne | 269—29 XR |
| 2,690,193 | 9/1954 | Smith | 138—99 |
| 2,712,326 | 7/1955 | Yurdin | 138—99 |
| 2,905,206 | 9/1959 | Creighton | 138—99 |
| 2,947,275 | 8/1960 | Edmonds | 269—25 |
| 3,117,904 | 1/1964 | Black | 138—99 XR |
| 3,241,207 | 3/1966 | Skinner | 138—99 XR |
| 3,379,218 | 4/1968 | Conde | 138—99 |

HERBERT F. ROSS, Primary Examiner

U.S. Cl. X.R.

269—270